Figure 1:
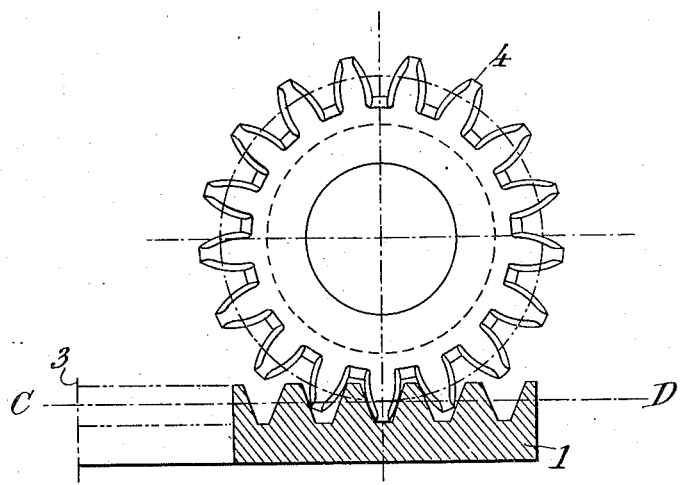

E. H. WINGQVIST.
METHOD OF MANUFACTURING BEVEL GEAR WHEELS.
APPLICATION FILED MAR. 14, 1918.

1,365,433.

Patented Jan. 11, 1921.
5 SHEETS—SHEET 1.

WITNESS:
René Bruine

INVENTOR:
Erik Hjalmar Wingqvist
By Attorneys,
Fraser, Junk & Myers

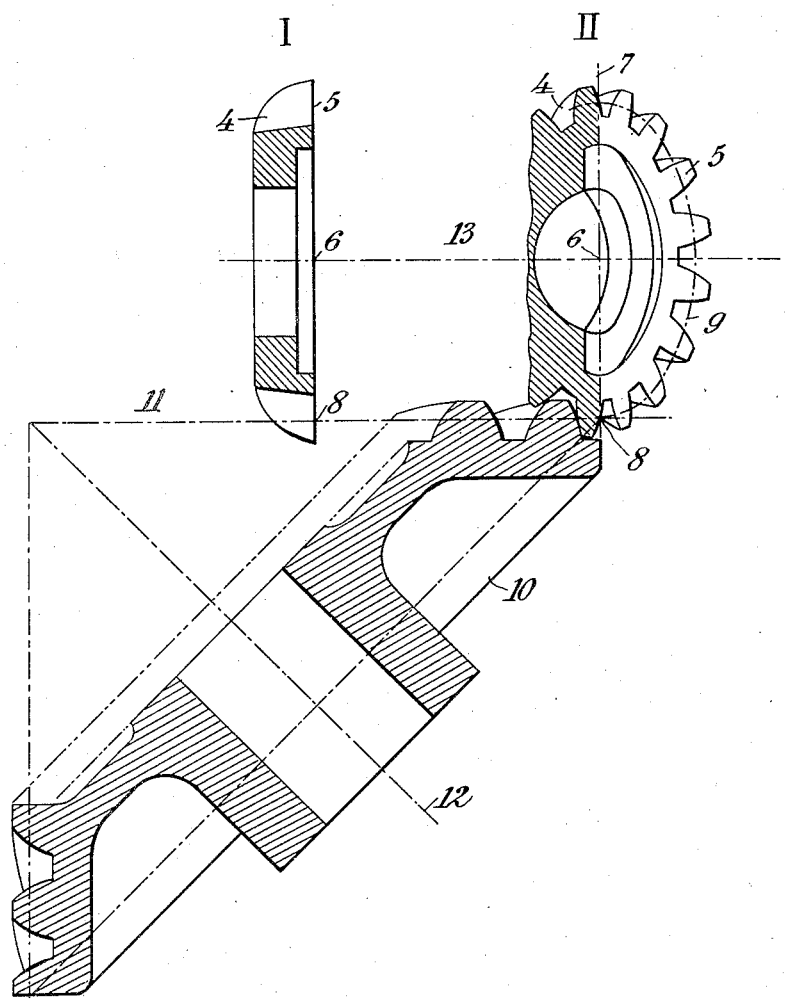

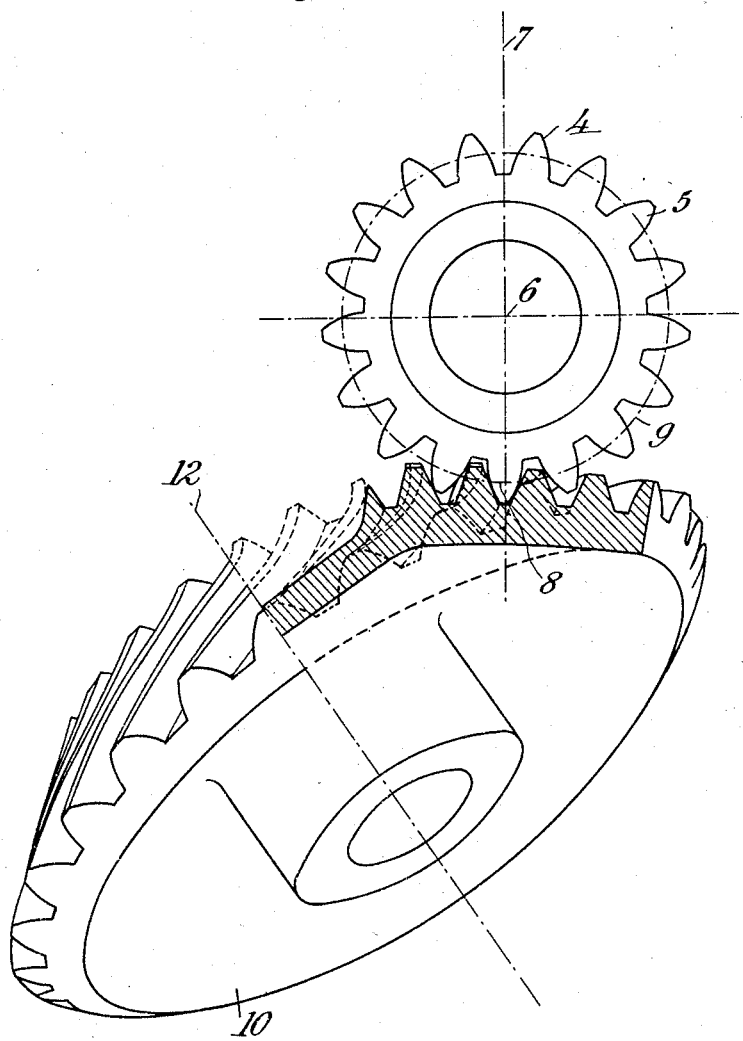

UNITED STATES PATENT OFFICE.

ERIK HJALMAR WINGQVIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF MANUFACTURING BEVEL-GEAR WHEELS.

1,365,433.            Specification of Letters Patent.       Patented Jan. 11, 1921.

Application filed March 14, 1918. Serial No. 222,385.

*To all whom it may concern:*

Be it known that I, ERIK HJALMAR WINGQVIST, a subject of the King of Sweden, residing at Gottenborg, in the Kingdom of Sweden, have invented a certain new and useful Method of Manufacturing Bevel-Gear Wheels, of which the following is a specification, reference being had to the drawings accompanying and forming a part thereof.

This invention contemplates a method of manufacturing bevel gear wheels of the design described in my co-pending patent application Serial No. 181,129 filed July 17, 1917, renewed April 2, 1919, Serial No. 287,074. The said gear wheels are characterized, chiefly, by this that both the teeth and the gaps are of equal width in all sections at right angles to the side surface of a tooth, measured in the pitch cone, the lines of intersection between the side surfaces of the teeth and the pitch cone, when developed in a plane, being formed as involutes of a circle having its center at the apex of the pitch cone. Moreover, the teeth of the said wheels are of equal height.

On account of the equal width and the equal height of the teeth, and also on account of the equal width of the gaps, it is possible, according to the present invention, to practically render the manufacture of bevel gear wheels quite as simple as the manufacture of common spur wheels, in which, as known, the teeth and the gaps have just the form indicated above.

As well-known in the art, spur wheels can be manufactured according to the generating principle in a single uninterrupted working operation by means of a cutting tool having itself the form of a spur wheel. The manufacture of such gear wheels is performed in the following manner, viz., when the cutting tool has been fed into the wheel blank to the desired depth, the cutting tool and the wheel blank are caused to perform a relative rolling movement corresponding to the movement of two coöperating spur wheels, at the same time as the cutter performs a series of cutting movements in the direction of the axis of the wheel blank. The advantages of this generating method are thought to be so well known as to render a description unnecessary.

The present invention has for its object to generate bevel gear wheels according to the rolling principle in a single uninterrupted working operation by means of a cutting tool of the kind described, which is accomplished by causing the cutting tool and the wheel blank to perform, in part, such a relative movement that the point of contact of the pitch circle of the cutting surface of the cutter with the pitch cone of the wheel blank describes a circle involute wound on the said cone, and, in part, a relative rolling movement corresponding to the movement of two coöperating gear wheels, while the cutter always takes up such a position relatively to the wheel blank that its cutting surface is perpendicular to the generated side surfaces of the teeth.

Figure 2:
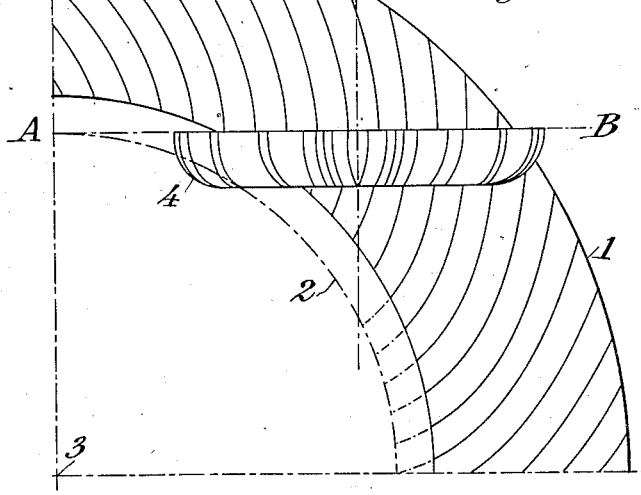
Figure 3:
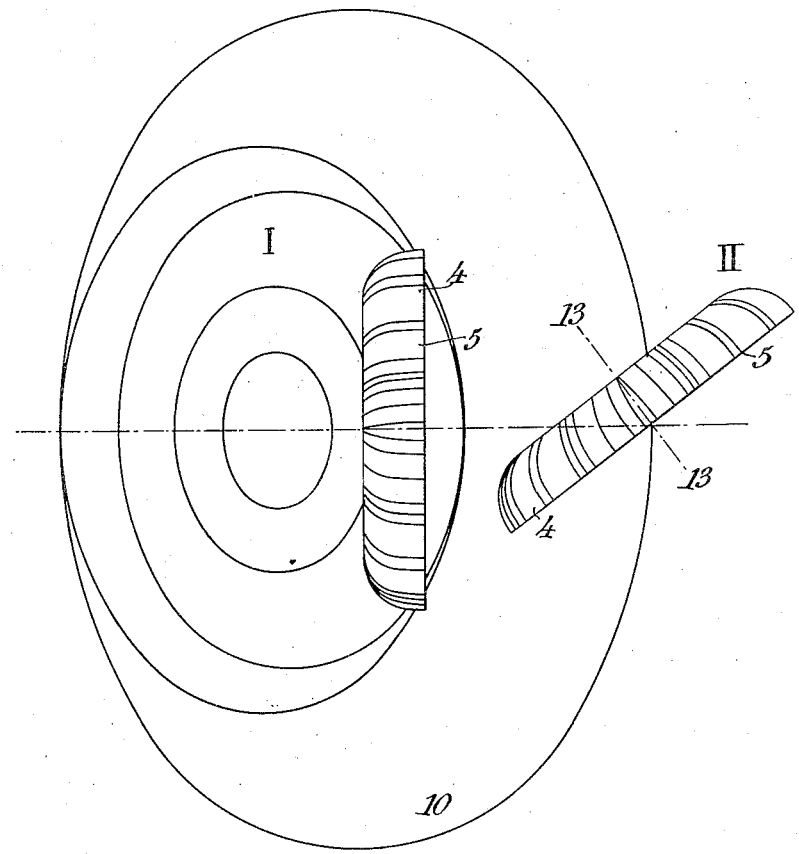
Figure 4:
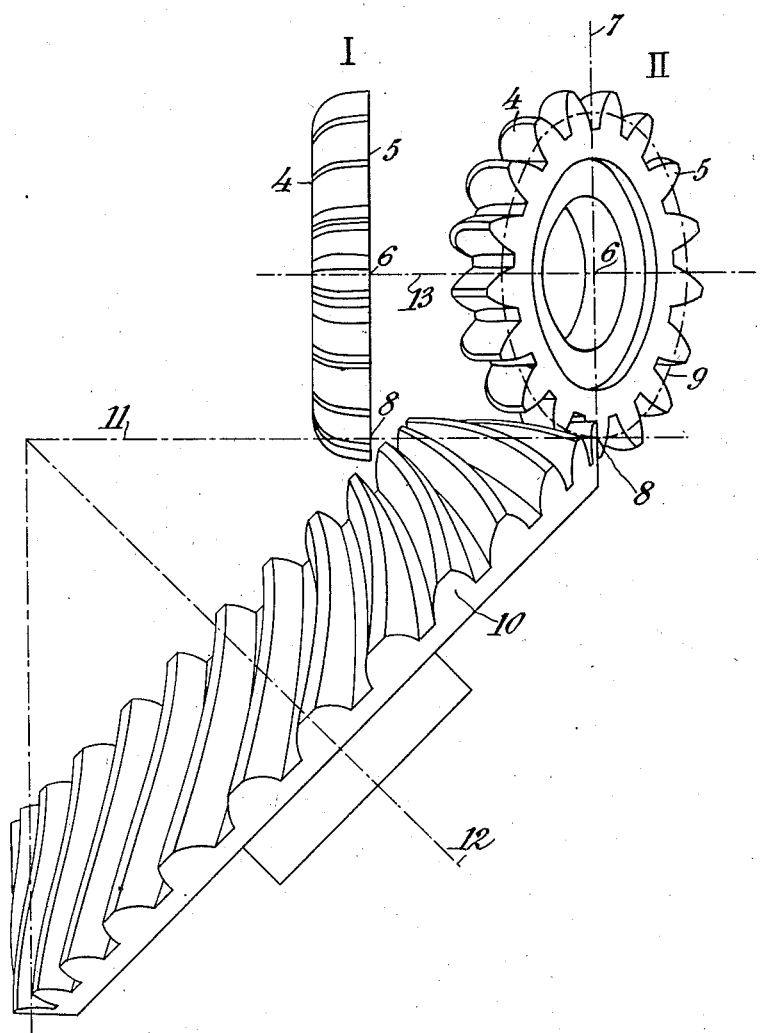

The invention is illustrated in the drawings annexed hereto. Figure 1 shows partly a section (on line A—B of Fig. 2) of part of an imaginary so-called generating wheel for bevel wheels of the kind considered, and partly a side elevation of the cutting tool. Fig. 2 is a plan view of part of the generating wheel with the cutting tool. Fig. 3 is a perspective view of the wheel blank with the cutting tool, the latter shown in its two end positions. Fig. 4 is a side elevation of the finished gear wheel, the cutting tool being shown in its two end positions. Fig. 5 is an axial section of the gear wheel shown in Fig. 4 (the cutting tool shown in section in its two end positions). Fig. 6 is a perspective view of the finished gear wheel, partly in section along the cutting surface of the cutter.

Figs. 1 and 2 do not show the method of manufacturing according to this invention but only serve to schematically illustrate the invention. The lines of intersection between the side surfaces of the teeth of the imaginary generating wheel 1 and the pitch plane C—D form involutes of the circle 2, the center of which is situated on the axis 3 of the generating wheel. The perpendicular distance between two consecutive involutes is known to be constant and equal to the pitch at the base circle 2. If the generating wheel 1 be cut by a plane at right angles to the circle involutes, for instance by the plane A—B, the section will obtain the form of a straight back (see Fig. 1). It is obvious that a spur wheel, and thus also a cutting tool 4 having the form of such a wheel, is capable of coöperating with the said rack, i. e. with the generating wheel. Theoretically, the cutting tool should in this case be infinitely thin, but by suitably tapering back its cutting teeth so that the cutting surface A—B only will come into contact with the side surfaces of the teeth and the bottoms of the gaps of the generating wheel, the cutting tool can be formed with sufficient thickness, as shown. The said cutting tool may, obviously, be placed anywhere in the generating wheel, provided the cutting surface be placed at right angles to the side surfaces of the teeth.

It being known that a bevel wheel can be generated by rolling a cone on the plane generating wheel 1, and that the teeth, and also the gaps, of the bevel wheel thus generated are of equal width in all sections at right angles to the side surfaces of the teeth, it is obvious that a cutting tool of the kind described can be placed anywhere in the bevel wheel, provided the cutting surface be placed at right angles to the side surfaces of the teeth. In other words, it is obvious that the bevel wheel can be generated by the said tool, provided that it always takes up such a position relatively to the bevel wheel that its cutting surface is perpendicular to the generated tooth sides, and, leaving the rolling movement out of consideration, the relative movement of the cutting tool and the wheel blank be such that, as hereinbefore mentioned, the point of contact of the pitch circle of the cutting surface describes the wound up involute.

It is obvious that the said relative movement may be effected in several ways by suitably choosing the separate movements of the cutting tool and the wheel blank.

One way of effecting the said movement is illustrated in Figs. 3 to 6. A point on the cutting tool 4, viz. the center 6 of its cutting surface 5 is here considered to describe a rectilinear movement from the position I to the position II at the same time as the cutting tool performs a turning movement about an axis 7 in the cutting surface (Figs. 4 to 6). Since, in this case, the axis 7 moves parallel with itself from the position I to the position II, it is obvious that all points on the said axis, and thus also its point of intersection 8 with the pitch circle 9 of the cutting surface 5 will describe a rectilinear movement. As shown in Figs. 4 to 6, the said point of intersection just forms the point of contact of the pitch circle 9 of the cutting surface 5 with the pitch cone 11 of the wheel blank 10.

If now the wheel blank 10 is rotated about its axis 12, it is obvious that the point of contact 8 will describe a curve on the pitch cone 11, the form of said curve being dependent on the speed with which the point 8 is moved from the position I to the position II, and also on the speed of rotation of the wheel blank 10. By suitably choosing said speeds, the said curve will obtain the desired form of a circle involute wound on the pitch cone. The cutting tool 4 must hereby turn about the axis 7 in the cutting surface in such manner that, as hereinbefore mentioned, the said surface is always perpendicular to the said circle involute.

The generation of the tooth profile is performed by turning the cutting tool 4 and the wheel blank 10, at each cutting operation, through a certain angle about their axes 13 and 12, respectively, in the same manner as two coöperating gear wheels.

From the foregoing it will be seen that the present invention enables the advantages of cutting spur gears according to the generating principle by means of a cutter having itself the form of a spur wheel or pinion, to be availed of in the cutting of bevel gears. This is possible because the bevel gears formed by the present method do not have tapering teeth and tapering gaps, but on the contrary have teeth and gaps which are each of uniform width from end to end, measured perpendicularly to the side or working faces of the teeth. This form enables the cutter to repeatedly traverse each gap until it is cut to the full depth, progressing thereto by a rolling movement which is participated in by the blank, so that the two turn forwardly and backwardly together on each cutting stroke like two meshing gears. Thus by making the cutter rotary with its cutting faces shaped like the teeth of a spur gear, as the rolling movement progresses the successive cutting teeth come into action, so that while one tooth is making the later or final cuts in one gap the next tooth in advance is making the earlier cuts in the next gap beyond. By this means the generation of all gaps is performed in a single uninterrupted working cycle of operations during the relative rolling movements of the cutting tool and the wheel blank.

What I claim is:—

1. The method of manufacturing curved tooth bevel gear wheels according to the generating principle, which consists in generating all the gaps in a single uninterrupted working operation by a cutting tool having the form of a spur wheel and executing movements relative to the wheel blank such that a cutting point on the cutting tool describes a circle involute on the pitch cone of the blank.

2. The method of manufacturing bevel gear wheels according to the generating principle, which consists in generating all the gaps in a single uninterrupted working operation by a cutting tool having the form of a spur wheel, the said cutting tool and the wheel blank being caused to perform the following relative movements, viz., first, such a relative movement that the point of contact of the pitch circle of the cutting surface of the cutter with the pitch cone of the wheel blank describes a circle involute wound on the said pitch-cone, and, second, a relative rolling movement corresponding to the movement of two coöperating gear wheels, the cutting tool always taking up such a position relatively to the wheel blank that its cutting surface is perpendicular to the generated side surfaces of the teeth.

3. A method of manufacturing bevel gear wheels according to claim 2, characterized in that the point of contact of the pitch circle of the cutting surface with the pitch cone of the wheel blank is caused to perform a rectilinear movement, while the wheel blank is rotated about its axis, the speeds of the said movements being such that the curve described by the said point of contact on the pitch cone will obtain the form of a circle involute wound on said pitch cone.

4. The method of manufacturing bevel gear wheels, which consists in cutting each tooth space in a single working operation by means of a cutting tool having substantially the shape of a truncated wedge with plane side surfaces, said tool performing a cutting movement along an involute of a circle, the center of which is situated at the apex of the pitch cone, and simultaneously describing the same rolling movement relatively to the wheel blank as would be described by a tooth of an imaginary generating wheel meshing with the gear wheel being made.

In testimony whereof I affix my signature.

ERIK HJALMAR WINGQVIST.